July 19, 1966 H. M. KLEINMAN 3,262,063

LINE VOLTAGE ENERGIZED TRANSISTOR SIGNAL
AMPLIFIER INCLUDING A HIGH VOLTAGE STAGE
AND A LOW VOLTAGE STAGE

Filed Feb. 25, 1963

INVENTOR.
HENRY M. KLEINMAN

BY Eugene M. Whitacre

Attorney

United States Patent Office 3,262,063

Patented July 19, 1966

3,262,063

LINE VOLTAGE ENERGIZED TRANSISTOR SIGNAL AMPLIFIER INCLUDING A HIGH VOLTAGE STAGE AND A LOW VOLTAGE STAGE

Henry M. Kleinman, Somerville, N.J., assignor to Radio Corporation of America, a corporation of Delaware Filed Feb. 25, 1963, Ser. No. 260,696
19 Claims. (Cl. 330—19)

Figure 1:
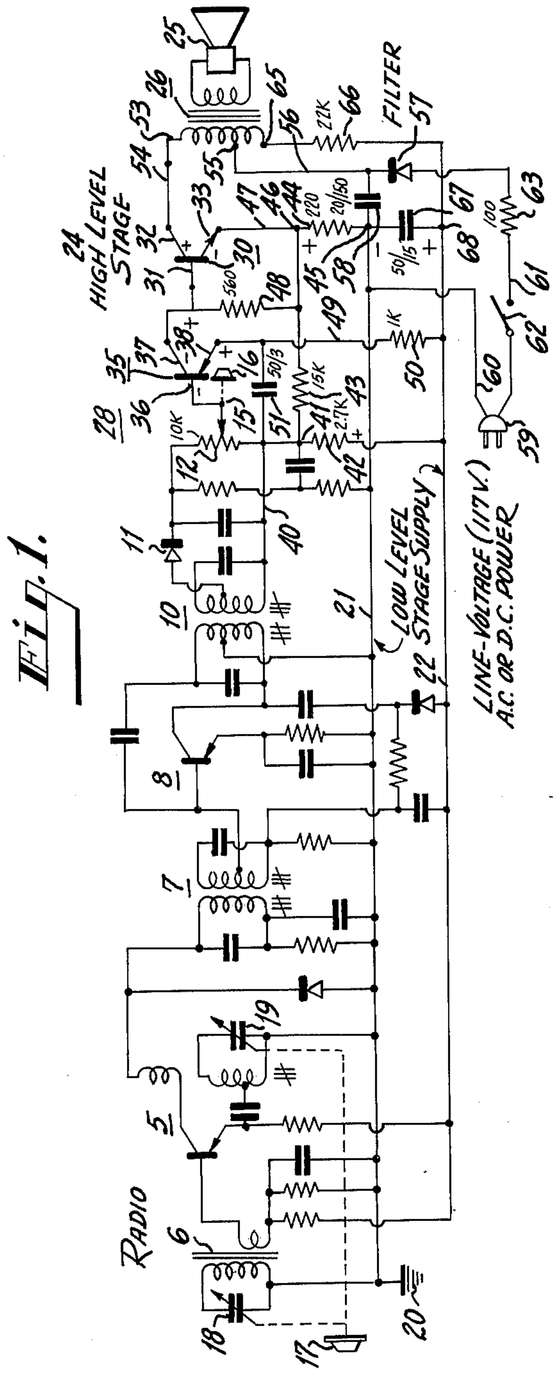

The present invention relates to semiconductor signal-translating apparatus of the type which is adapted for energization by the alternating current mains or power lines generally available in the home.

Some type of power line operated signal-translating apparatus of the type referred to have generally been provided with signal-translating devices of the electron-tube type which require relatively-high supply voltages for the operation thereof. Such apparatus thus operates effectively on line-voltage and stepped-up line-voltage power. Other types of power line operated apparatus incorporate signal translating devices of the transistor type which require relatively low supply voltages.

The problem with transistorized signal-translating apparatus and equipment for power line operation, therefore, is to provide low-cost and efficient means for reducing the relatively-high line voltage, as supplied directly or by rectification from a wall outlet for example, to the much lower voltage or voltages which may be useful to energize the various transistor circuits and elements thereof.

It will be appreciated that conventional voltage-reducing means may include a step-down transformer or one or more series resistor elements in a supply circuit through which the line current may be directed to flow. Thus a normal line voltage of 117 volts A.-C., for example, may be reduced sufficiently as to 12 volts rectified, for transistor circuit operation. However, suitable power-supply transformer or resistor means of required wattage and size for such wide voltage reduction may be relatively costly. Furthermore, the use of resistor means for voltage dropping in power supply circuits always introduces undesirable energy loss and the added problem of heat dissipation. In addition to the foregoing, to produce the requisite power output, the power supply must provide low voltage at high current levels so that the power supply filtering requires large and expensive filter capacitors to remove the ripple components from the rectified voltage.

It is, therefore, an object of this invention to provide a low-cost transistorized signal-translating system for power line operation which eliminates the use of relatively costly step-down power supply transformers, as well as voltage-dropping power-supply resistor means which are heat producing and wasteful of energy, and must be filtered with relatively-large and costly capacitor means.

It is also an object of this invention to provide an improved multi-stage transistor output or power amplifier for use as a unit in sound-reproducing signal-translating systems which operate directly from alternating-current or like line-voltage power supply means, and without using power transformer or power-dissipating resistor means in the power supply circuits therefor.

It is also a further object of this invention to provide transistorized line-voltage power-operated signal-translating apparatus, of the low-cost portable radio or phonograph record-player type, which may be energized directly from a wall outlet or like commercial power source and at the supply or line voltage, without step-down transformation or power-dissipating voltage drop in the power supply circuits thereof.

It is a further object of this invention to provide a low-cost, high-gain, transistorized signal amplifier to operate directly from commercial power-supply or wall-outlet means, either A.-C. or D.-C., without using power transformer or power-dissipating resistor means in the power supply circuits, and with a minimum or reduced filtering of the power supply circuits while retaining effective hum reduction.

In accordance with one embodiment of the invention, the transistor power amplifier may be an audio-frequency power amplifier provided with at least one high-voltage silicon power transistor output stage. The output stage is driven by a high-beta transistor stage of the low-voltage, low-level type which may be of like or opposite conductivity. The amplifier circuits preferably are direct-coupled, and a minimum of, or very little, filtering is provided in the power supply circuits. The series-resistor means for the low-level low-voltage circuits are of the filter-resistor type and thus are not used for voltage dropping at high current levels. Therefore, both the capacitor and resistor means of the filter may be of the small low-cost type.

The silicon power transistor may be of a commercial mesa type recently developed that has a high reverse or break-down voltage between the collector and emitter higher than the supply line voltage peaks which break-down voltage with present transistors is about 300 volts. The transistor presently reaches safe peak collector currents of over 100 millamperes, and yet may be driven by a low-voltage transistor stage which may require an operating current of only a few milliamperes.

The high-voltage output transistor may thus be energized at line voltage directly from rectified line current. Thus it does not require either a step-down transformer or power-dissipating voltage-dropping resistor means in its supply circuits. The first stage or driver transistor, and other low-level signal-translating stages or elements of the apparatus, may be energized from the supply line through low-wattage and low-cost R-C filter means inserted in circuit between the high-voltage power supply circuit and the low-level operating circuits. The series resistor elements of the filter means are at the same time effective to reduce the line voltage to the required low values for the low-voltage, low-level transistor operating circuits.

The invention will further be understood from the following description of certain embodiments thereof, when considered in connection with the accompanying drawing, and its scope is pointed out in the appended claims.

Figure 2:
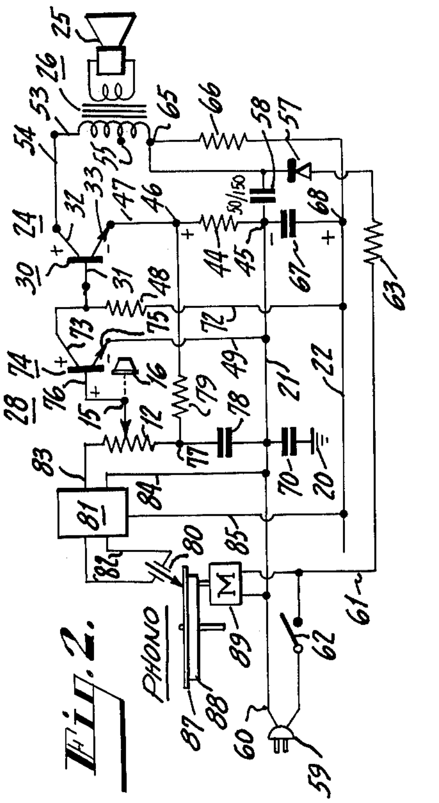

In the drawing, FIGURE 1 is a schematic circuit diagram of a transistorized radio receiver provided with an improved high-level signal amplifier and power supply means embodying the invention, and FIGURE 2 is a further schematic circuit diagram of a phonograph record player showing a modification of the amplifier and power supply means of FIGURE 1, in accordance with the invention.

Referring to FIGURE 1 of the drawing, the radio receiver represented by the circuit is adapted to operate with line-voltage power supplied economically and effectively to the transistor signal-translating elements thereof. By way of example, the receiver comprises suitable conventional signal translating circuits of which the first is a transistorized signal mixer stage 5.

The mixer stage is coupled on its input side to the usual conventional ferrite rod antenna 6 for signal reception, and is coupled on its output side through a tuned intermediate-frequency input transformer 7 with a transistorized intermediate-frequency amplifier comprising a single stage 8. The intermediate-frequency amplifier, in turn, is coupled through a tuned output transformer 10 with the second or audio-frequency detector 11. This is represented as a diode coupled to an output potentiometer-type load resistor 12 from which is derived the audio-frequency output signal through a variable volume-control contact 15. The latter is controlled by the usual volume-control knob indicated at 16. The receiver is manually tunable by suitable means indicated by a tuning dial 17 connected with variable tuning capacitors, indicated at 18 and 19, for the antenna and oscillator circuits of the input or mixer stage 5.

The receiver is provided with a common ground or chassis element 20 having a common ground or circuit return lead 21. This operates also as one lead of the power supply circuitry of the receiver and in conjunction with a low-voltage positive supply lead 22. The ground lead 20 thus operates as the negative side. The leads 21 and 22 provide a low-voltage operating-current or power-supply source for the low-level signal-translating stages of the receiver, including the low-level audio-frequency amplifier stages which follow the detector and volume control means as will be described.

The specific construction or operation of the signal input end of the receiver preceding the volume control device, except for the low-voltage power supply circuit 21–22, will not be further described. The receiver shown represents any electronic signal-translating apparatus or equipment of the plug-in power line operated type which may effectively use transistor signal-translating elements therein and operate directly on line-voltage power.

The volume control means 12–15 is followed by a transistorized audio-frequency amplifier which may comprise two or more cascade-connected stages terminating in a high-level power output stage 24 coupled to a signal-output utilization device, such as a loudspeaker 25, through suitable output coupling means such as a transformer 26. The output stage 24 is driven by a low-level amplifier stage 28 and may be preceded by additional low-level amplifier stages in any particular apparatus. In the present example the stage 28 is coupled directly to the volume-control means, or audio-frequency signal source, as the first stage of the two-stage audio-frequency amplifier provided for the receiver.

The output stage 24 comprises a high-voltage silicon power transistor 30 of the NPN type having a base 31, a collector 32, and an emitter 33. This transistor may be considered to be of a mesa type (TA–2301) which has a relatively-high reverse or breakdown voltage between the collector and emitter. This breakdown voltage must be greater than the supply or line-voltage peaks, which are usually about 150 volts, and with present developments the breakdown voltage may be considered to be about 300 volts for the transistor referred to. This transistor operates with peak collector currents of over 100 milliamperes (ma.) but may be driven effectively by a low-voltage transistor 35 in the driver stage 28. By way of example, the average current drawn by the transistor 30 may be about 30 ma.

A suitable low-voltage driver transistor 35 may be of the commercial high-beta 2N2614 type having a base 36, a collector 37 and an emitter 38 as indicated. Low voltage transistors generally operate with a supply voltage of the order of 25 volts. For example, low voltage transistor receivers are transistors which operate efficiently on voltages of 4.5 volts or less. The transistor 35 provides a high-gain transistor stage of the low-voltage, low-level type, and may be of like or opposite conductivity with respect to the high-level output stage 24. In the present example, it is of the opposite or PNP conductivity type as indicated, and requires an operating current of only a few milliamperes (such as 2 ma.) as compared with the output stage.

As will be seen from the circuit diagram, both transistors operate with a common-emitter circuit configuration. The base 36 of the first stage or driver transistor is connected to the volume-control contact 15 and, through the signal-supply resistor or potentiometer element 12, to the detector low-voltage output lead 40. The latter is connected with a bias supply terminal 41 on a series voltage-divider network or circuit comprising three series resistors 42, 43, and 44 connected between the positive low-level supply lead 22, in connection with the resistor element 42, and the negative or ground supply lead 21 in connection with resistor element 44 at a terminal 45.

An intermediate supply terminal 46 on the voltage divider circuit, between the resistor elements 43 and 44, is connected through a lead 47 with the emitter 33 of the output transistor 30 and also, through a collector or direct-coupling resistor 48, with both the base 31 of the high-voltage transistor 30 and the collector 37 of the low-voltage driver transistor 35. The emitter 38 of the driver transistor 35 is connected, through a lead 49 and an emitter circuit resistor 50, with the positive supply lead 22, thereby completing the emitter-collector and emitter-base circuits of the driver stage with the low-voltage supply circuit 21–22. An audio frequency coupling capacitor 51 completes the audio frequency supply circuit from the detector 11 to the emitter 16, and decouples the bias network resistors 42, 43, and 44 to eliminate audio frequency feedback and maintain high gain. The capacitor 51 may have a capacity of 50 mfd. at the low voltage and thus be of relatively low cost.

The transformer 26, by which the high-level output stage 24 is coupled to the sound-reproducing speaker means 25, is provided with a primary winding 53 connected in the output or collector circuit 54 of the transistor 30 as the load element therein. The winding is supplied with operating current for the collector circuit through an intermediate tap or terminal 55 from a positive D.-C. supply lead 56. The latter is connected with a power-supply rectifier 57 of the simple diode type having an input filter capacitor 58 connected between the supply lead 56 and the ground or common return lead 21 of the system at the terminal 45. Line-voltage A.-C. or D.-C. power is applied to the receiver through the usual line-cord connection comprising a line or wall-plug 59 having one line-cord connection 60 with the ground or common return lead 21 and a second line-cord connection 61, through a power switch 62 and a protective series resistor 63, with the rectifier 57.

Thus, when the line switch 62 is closed and the plug 59 is connected with a conventional wall outlet or like current source (not shown), the high-voltage transistor 30 is energized with high-voltage direct current through the rectifier 57 across the input filter capacitor 58. Thus, the high-voltage transistor 30 receives substantially full rectified line-voltage without step-up or reduction, and this circuit may provide a peak voltage of substantially 140 volts D.-C. across an input capacitor 58 of 20 mfd. and with supply or line-voltage of 117 volts A.-C., for example. Some voltage is lost across the protective line resistor 63.

In the present example the portion of the output transformer primary winding, between the tap 55 and an end terminal 65, is utilized for hum-bucking or cancellation in the output circuit in accordance with known practice for the supply circuits of such receivers. For this purpose the rectified supply current for the low-voltage circuit 21–22 is taken from the terminal 65 through a series low-wattage filter resistor 66 and applied to a low-voltage shunt filter capacitor 67 connected between a supply terminal 68 on the positive supply lead 22 and the terminal 45 on the ground lead 21. By way of example, the filter resistor may have a resistance of 22,000 ohms as indicated and the filter capacitor 67 may have a capacity of 50 mfd. at 15 volts.

The rectified direct current supplied to the transformer primary terminal 55 thus flows mainly through the primary winding 53 and the collector circuit 54 of the output stage 24. A relatively low current flows from the terminal 55 through the hum-cancellation section between that terminal and the terminal 65. The filter means 66–67 connected with the terminal 65, thus provides substantially ripple-free, low voltage, operating current at the supply leads 21–22 for the low-level input stages of the receiver and for the input or driver stage of the output amplifier.

In operation, the collector current of the PNP input or driver transistor 35 flows through the direct coupling resistor 48 and thus provides a positive forward operating bias for the base of the NPN high-voltage output transistor 30. Bias voltage for the input or driver-stage transistor 35 is obtained from the voltage divider circuit. Due to the polarity of the conductors 22 and 21 and the respective connections of the base and collector of the driver transistor 35 with the terminals 41 and 46 respectively, the base 36 is negatively biased as is the collector 37. The emitter 38 is positively biased through its circuit connection with the positive lead 22 of the low-voltage supply circuit. Bias stability is achieved by negative feedback of the emitter current of the high-voltage transistor through the resistor 44 of the network.

The low-voltage provided at the supply circuit 21–22 is thus derived through a series filter resistor 66 of low-wattage and low-cost in connection with a low-cost low-voltage filter capacitor 67. This filter means thus effectively provides reduction of the relatively-high output-stage operating voltage to a safe and much-reduced operating voltage for all lower-level amplifier stages. The series resistor means thus effectively provided for the low-level low-voltage stages is in a different branch of the operating-current supply circuit from the high-level high-voltage output stage and thus is not required for voltage dropping at high current levels.

From the foregoing description, it will be seen that the two direct-coupled low-voltage and high-voltage transistor amplifier stages provide a low-cost, high-gain audio-frequency power amplifier which may operate from line-voltage power supply means without using a power transformer or any high power dissipating resistor element for reducing the input voltage for the lower-level stage supply.

The circuit of FIGURE 2, to which attention is now directed, shows a modification of the two-stage power amplifier of FIGURE 1, wherein the high-level high-voltage output transistor stage is driven by a low-voltage transistor stage of similar conductivity type, and in a phonograph record-playing system as the audio-frequency signal source. In this circuit, like elements as appear in FIGURE 1 are designated by the same reference numerals.

In this amplifier circuit, the high-level output stage 24 is substantially the same as in the preceding figure and comprises the high-voltage silicon mesa transistor 30 coupled through the output transformer 26 to the loudspeaker signal-translating device 25 for sound reproduction. The collector circuit 54 is connected through the full primary winding 53 to the terminal 65 to which rectified supply current is directly applied through the power rectifier 57, instead of to the tap 55 as in the preceding example. The hum-cancellation feature provided by the transformer connection between the tap 55 and terminal 65 is not provided in this supply circuit. Therefore, the input filter capacitor 58 may be increased from 20 mfd. to 50 mfd. to compensate. The series protective resistor 63 and the power switch 62 are provided in the input circuit lead 61 for the power plug 59. The opposite power supply lead 60 is connected with the common circuit return lead 21. In the present example this lead 21 is coupled to chassis or ground 20 through a suitable bypass capacitor 70.

The low-level low-voltage supply circuit 21–22 is provided with operating current through the low-wattage series filter resistor 66 and across the low-voltage filter capacitor 67 connected between the terminals 68 and 45. The emitter 33 of the output transistor 30 is connected through the lead 47 and the feedback resistor 44 to the terminal 45 thereby providing the same collector and emitter biasing or polarization as in the preceding example. However, as the two transistors are of similar conductivity types, the coupling or collector resistor 48 provided in circuit with the base 31, is connected to the positive low-voltage supply lead 22 through the connection lead 72. This places a proper (reverse) positive bias on the collector 73 of the NPN driver transistor 74 and the connection lead 49 for the emitter 75 is connected to the negative supply lead 21, thereby providing a proper negative bias on the emitter.

The base 76 of the driver transistor 74 is, as in the preceding example, connected to the volume-control contact 15, and, through the volume-control resistor 12, to a terminal 77 bypassed to the common lead 21 through an audio-frequency bypass capacitor 78. Positive bias potential is provided at the terminal 46 in response to emitter current flow through the resistor 44 and is applied to the base through a feedback supply resistor 79 connected between the terminals 46 and 77. As in the preceding example, signals applied to the volume-control resistor 12 are applied to the driver transistor 74 and, through the direct coupling, to the output power transistor 30 for driving the loudspeaker 25. This amplifier circuit is of the common emitter type as the preceding example, and operates in the same manner except for the fact that the transistors are of the same conductivity types.

In the present example the applied signals are derived from a low-voltage phonograph pickup 80, and an amplifier stage 81 of the low-level low-voltage type is provided in the amplifier circuit preceding the volume-control means 12–15 to attain proper overall gain. The pickup device 80 is connected with the first stage 81 through an output circuit comprising the leads 82, and the amplified signals from the stage 81 are applied to the volume-control resistor 12–15 through an output circuit indicated by the leads 83 and 84. The lead 83 is connected directly with the high-volume end of the resistor 12 as indicated, and the lead 84 is connected to the common or ground lead 21, and thence through the bypass capacitor 78 with the terminal 77 of the volume-control resistor 12.

The low-voltage amplifier stage 81 is supplied with low-voltage operating current through a supply lead 85 connected with the positive supply lead 22, and the lead 84 which is connected with the negative supply lead 21. The low-level stages 28 and 81 are thus supplied with operating current at low-voltage from the supply circuit 21–22 through the voltage-dropping, low-wattage, filter resistor 66 in conjunction with the filter capacitor 67, thereby producing low-voltage hum-free operating current without power dissipating resistors or transformer means, and at relatively low cost, as in the preceding example.

The pickup 80 is shown in operative relation to the usual phonograph record 87 which is carried by a rotary turn-table 88 driven by a conventional turn-table motor indicated at 89. The motor is energized, through the circuit connections indicated, from the supply leads 60 and 61 upon closure of the operating switch 62.

The phonograph circuit shown is adapted for low-cost high-volume production. As in the preceding example, the amplifier circuits comprise direct-coupled low-voltage and high-voltage transistors, involving a minimum of filtering in the power supply circuits, while the series resistor means for the driver and other low-level low-voltage circuits are of the filter resistor type and thus are not used for voltage reduction at high current levels.

The high-voltage power output transistor stage, in each of the circuits shown, is driven by a low-voltage transistor stage directly coupled thereto, without any voltage-reducing means being required for the power transistor, while the operating voltages for the driver as well as any other low-voltage signal-translating devices in the system or apparatus involved, are provided by the drop attained in low-cost filtering circuits, without substantial power dissipation or loss.

The improved electronic signal translating system using the transistorized power amplifier and power supply circuits of the present invention is, therefore, suitable for operation directly from the usual high-voltage commercial supply line or wall outlet. This eliminates the necessity for transformer or other voltage-reducing power-conveying means for transistor operation in a supply-line or power-operated system and results in savings in weight, cost and power consumption. Low-voltage power supply and hum reduction in the low-level signal-translating stages of the system are attained with substantially no power loss.

What is claimed is:

1. In a signal translating system of the alternating current line voltage power-operated type, a high level signal amplifier and power supply circuit for operation directly on line-voltage power applied to said system, comprising in combination, a high-voltage power transistor exhibiting a collector to emitter breakdown voltage greater than the voltage of the alternating current line voltage and a high-gain low-voltage driver transistor exhibiting a collector to emitter breakdown voltage that is lower than that of said high voltage power transistor for driving said high voltage power transistor, each of said transistors having an input element, an output element and a common element, circuit means direct current coupling the output and common electrodes of said driver transistor to the input and common electrodes of said high voltage transistor for signal translation and amplification, means including a high-voltage power-supply circuit for energizing the power transistor connected between the output and the common elements thereof from rectified line current, said power-supply circuit developing a voltage at least one half the peak voltage of said alternating current voltage, and means including a low-voltage supply circuit connected to said driver transistor and for energizing the driver transistor from said alternating current line voltage power, and said last named means including a low-wattage resistance-capacitance filter means connected between the high-voltage power supply circuit and said low-voltage supply circuit for developing a voltage substantially lower than that developed by said high-voltage power supply circuit.

2. A transistor signal amplifier for direct supply-voltage line-power operation comprising, a first low-voltage transistor having a base-emitter signal input circuit, a second high-voltage power transistor exhibiting a collector to emitter breakdown voltage greater than the voltage of the supply line and greater than the collector to emitter breakdown voltage of the first transistor, a line-power supply circuit having a rectifier and input filter capacitor connected to rectify said line voltage to produce a direct-current high voltage output having a value in the order of 100 volts, an input circuit coupled to said first transistor, means coupling said low-voltage transistor to said high-voltage transistor to provide two-stage signal translation and amplification in response to applied signals at said input circuit, means for applying line-voltage energization from the input filter capacitor of said supply circuit to said high-voltage transistor output circuit, and means including a filter circuit having a low-wattage series resistor element relative to said high-voltage output and a low-voltage capacitor element for applying voltage energization substantially lower than said line voltage energization to said low-voltage transistor from said supply circuit and said input filter capacitor.

3. A line-voltage transistor amplifier comprising, at least two transistors with signal input and output terminals, a line-power supply circuit including a supply-voltage rectifier and voltage-dropping filter means for producing a high energizing voltage having a value of the order of 100 volts, means coupling the output terminals of a first of said transistors to the input terminals of the second of said transistors in a two-stage signal translating circuit, the second of said transistors having a higher collector-to-emitter breakdown voltage than the supply-voltage peaks, means, including an output circuit, connecting said supply circuit to said second transistor for applying said high energizing voltage from said supply-voltage rectifier directly to said second transistor, and means connecting said supply circuit to said first transistor for applying a substantially lower energizing voltage than said high energizing voltage applied to said second transistor from said supply-voltage rectifier to said first transistor through said voltage dropping filter means.

4. A line voltage transistor amplifier as defined in claim 3 wherein said coupling means direct current couples the output terminals of said first of said transistors to the input terminals of said second of said transistors in a two-stage signal translating circuit.

5. An amplifying system adapted to be energized from an alternating current power line comprising:

a first transistor having base, emitter and collector electrodes and exhibiting a collector-to-emitter breakdown voltage greater than the peak voltage of the alternating current power line;

a second transistor having base, emitter and collector electrodes and exhibiting a collector-to-emitter breakdown voltage that is lower than that of said first transistor;

direct current circuit means connecting the collector electrode of said second transistor to the base electrode of said first transistor;

a rectifier circuit direct current connected to said alternating current power line for rectifying the alternating current voltage;

a first filter circuit connected to said rectifier circuit for filtering the output of said rectifier circuit to provide a direct current high voltage supply, the value of said high voltage being in the order of the peak value of one-half cycle of the alternating current power line voltage;

circuit means connecting the first filter circuit between the collector and emitter electrodes of said first transistor for providing a high voltage high current source of energization for said first transistor, said circuit means including an output circuit for developing output signals;

a second filter circuit connected to said rectifier circuit to provide a direct current low voltage-low current supply, the value of said low voltage being substantially lower than said high voltage;

circuit means connecting the second filter circuit between the base, collector and emitter electrodes of said second transistor for providing a low voltage-low current source of energization for said second transistor; and input circuit means coupled to the base electrode of said second transistor for applying input signals to be amplified.

6. An audio amplifier adapted to be energized from an alternating current power line voltage comprising:

a power transistor having base, emitter and collector electrodes and exhibiting a collector-to-emitter breakdown voltage of at least the peak amplitude of the alternating current power line voltage;

an audio transformer including a primary winding and a secondary winding, said secondary winding being adapted to be connected to a utilization circuit;

circuit means, including the primary winding of said audio transformer, connected to said base, emitter and collector electrodes of said power transistor to provide a power amplifier stage;

a second transistor having base, emitter and collector electrodes and exhibiting a collector-to-emitter breakdown voltage that is substantially lower than the breakdown voltage of said power transistor;

circuit means, including a signal input circuit, connected to the base, emitter and collector electrodes of said second transistor to provide a driver stage and for coupling said driver stage to said power amplifier stage;

a rectifier circuit direct current connected to said alternating current power line for rectifying said power line voltage to provide an unfiltered high voltage in the order of 140 volts;

a first filter circuit connected between said rectifier circuit and said power amplifier stage to provide a high voltage-high current direct current source of energization in the order of 100 volts for said power amplifier stage; and a second filter circuit having a lower wattage than said first filter circuit connected between said first filter circuit and said driver stage to provide a low voltage-low current direct current source of energization for said driver stage, the low voltage-low current output of said second filter circuit being substantially lower than the high voltage high current output of said first filter circuit, whereby the filtering for the driver stage is accomplished at a much lower power level than the filtering for said power stage.

7. A transistor amplifier circuit operative from an alternating current source supplying a nominal voltage of about 115 volts comprising, a high voltage transistor having base, emitter and collector electrodes, and exhibiting a collector to emitter break-down voltage equal to at least the voltage of said source, a low voltage transistor having base, emitter and collector electrodes and exhibiting a collector to emitter break-down voltage substantially lower than that of said high voltage transistor, a signal input circuit coupled between the base and emitter electrodes of said low voltage transistor, circuit means coupling the collector and emitter electrodes of said low voltage transistor to the base and emitter electrodes of said high voltage transistor, utilization means including an inductive winding coupled between the collector and emitter electrodes of said high voltage transistor, power supply means connected to said alternating current source for developing a rectified voltage of a value which is at least one-half the nominal voltage of said source and for applying said voltage at a relatively high current between the collector and emitter electrodes of said high voltage transistor, and means including a series resistor and shunt capacitor for developing a rectified voltage of a value which is relatively low with respect to the voltage of said source and for applying said relatively low voltage at a relatively low current between the collector and emitter electrodes of said low voltage transistor.

8. A transistor amplifier circuit as defined in claim 7 in which the collector to emitter break-down voltage of said high voltage transistor is equal to at least 140 volts, in which the value of said relatively low rectified voltage is of the order of 25 volts, and in which the value of said rectified voltage applied to said high voltage transistor is of the order of 100 volts.

9. A transistor amplifier circuit as defined in claim 7 in which said high voltage transistor and said low voltage transistor are of the same type conductivity.

10. A transistor amplifier circuit as defined in claim 7 in which said high voltage transistor and said low voltage transistor are of opposite type conductivity.

11. A transistor amplifier circuit as defined in claim 7 wherein said circuit coupling means direct current couples the collector and emitter electrodes of said low voltage transistor to the base and emitter electrodes of said high voltage transistor.

12. A transistor signal amplifier operative from an alternating current power line comprising, a first transistor having base, emitter and collector electrodes and exhibiting a collector to emitter breakdown voltage greater than the peak voltage of the alternating current power line, a second transistor having base, emitter and collector electrodes and exhibiting a collector to emitter break-down voltage which is substantially lower than that of said first transistor.

a rectifier circuit direct current connected to said alternating current power line for developing a high voltage of the order of the peak value of one-half cycle of the alternating current power line voltage, circuit means coupling the collector and emitter electrodes of said second transistor to the base and emitter electrodes of said first transistor for signal translation and amplification, resistor-capacitor filter means connected between said rectifier circuit and the collector and emitter electrodes of said first transistor for applying said high voltage between said electrodes at a relatively high current, and resistor-capacitor filter means connected between said rectifier circuit and the collector and emitter electrodes of said second transistor for developing a voltage substantially lower than said high voltage and for applying said lower voltage between the collector and emitter electrodes of said second transistor at a relatively low current.

13. A transistor signal amplifier as defined in claim 12 wherein said circuit coupling means direct current couples the collector and emitter electrodes of said second transistor to the base and emitter electrodes of said first transistor for signal translation and amplification.

14. In a signal translating system of the alternating current line voltage operated type having a power supply circuit adapted for plug-in connection with the alternating current line voltage mains and a shunt filter capacitor for smoothing power supply current drived therefrom, a high-level signal amplifier, comprising, a high-level signal output stage including a high-voltage transistor amplifier device having base, emitter and collector electrodes and exhibiting a collector-to-emitter break-down voltage greater than the peak voltage of said alternating current mains, means connected between said power supply circuit and said transistor amplifier device for developing a direct-current voltage having a value of the order of one-half the root-mean-square value of said alternating current line voltage and for applying said voltage between the collector and emitter electrodes of said device at a relatively high current, a low level high-gain driver stage including a low voltage transistor amplifier device having base, emitter and collector electrodes and exhibting a collector to emitter break-down voltage substantially lower than that of said high-voltage transistor device, circuit means coupling the collector and emitter electrodes of said low voltage transistor amplifier device to the base and emitter electrodes of said high voltage transistor amplifier device for signal translation and amplification, a direct current voltage supply circuit comprising first and second low voltage conductors connected between said power supply circuit and said low voltage transistor device for developing voltages substantially lower than that applied to said high voltage transistor device,
a filter capacitor connected between said conductors,
a filter resistor connected between said first low voltage conductor and one terminal of said shunt filter capacitor,
means providing a conductive connection between said second low voltage conductor and the other terminal of said shunt filter capacitor,
means providing a conductive connection between said first conductor and the emitter electrode of said driver transistor amplifier device, and
means providing a conductive connection between said second conductor and the collector electrode of said driver transistor device.

15. A high-level signal amplifier as defined in claim 14, in which there is also included a voltage divider resistor circuit connected between said low-voltage conductors and having intermediate terminals thereon for developing and applying low-voltage operating biases to the base and emitter electrodes of said driver and output transistor amplifier devices.

16. A high level signal amplifier as defined in claim 15 in which said voltage divider circuit includes a first resistor connected between the emitter electrode of said output transistor device and said second low voltage conductor for stabilizing the operating bias of said output transistor device.

17. A high level signal amplifier as defined in claim 16 in which there is also included a resistor connected between the emitter electrode of said driver transistor device and said first low voltage conductor for stabilizing the operating bias of said driver transistor device.

18. A high level signal amplifier as defined in claim 17 in which said voltage divider circuit also includes a second resistor connected between the emitter electrode of said output transistor device and the base electrode of said driver transistor device for further stabilizing the operating bias of said driver transistor device.

19. A high level signal amplifier as defined in claim 18 in which said high voltage transistor amplifier device is a silicon transistor of NPN type conductivity and in which said direct current voltage supply circuit develops positive and negative voltages at said first and said second low voltage conductors respectively.

References Cited by the Examiner

UNITED STATES PATENTS

| | | | |
|---|---|---|---|
| 2,631,260 | 3/1953 | Maron ---------- | 330—123 X |
| 2,866,859 | 12/1958 | Stanley ----------- | 330—22 X |
| 3,110,868 | 1/1963 | Pearson et al. ------ | 330—15 X |
| 3,166,719 | 1/1965 | Wiencek ---------- | 330—22 X |

ROY LAKE, *Primary Examiner.*

NATHAN KAUFMAN, *Examiner.*

F. D. PARIS, *Assistant Examiner.*